(No Model.)

F. J. LYONS.
CLUTCH.

No. 590,068. Patented Sept. 14, 1897.

Witnesses:
G. A. Pennington
T. R. Cornwall

Inventor
Francis J. Lyons
by Paul Bakewell
his atty.

UNITED STATES PATENT OFFICE.

FRANCIS J. LYONS, OF ST. LOUIS, MISSOURI.

CLUTCH.

SPECIFICATION forming part of Letters Patent No. 590,068, dated September 14, 1897.

Application filed January 15, 1897. Serial No. 619,288. (No model.)

*To all whom it may concern:*

Be it known that I, FRANCIS J. LYONS, a citizen of the United States, residing at the city of St. Louis, State of Missouri, have invented a certain new and useful Improvement in Clutches, of which the following is a full, clear, and exact description, reference being had to the accompanying drawings, forming a part of this specification, wherein—

Figure 1:
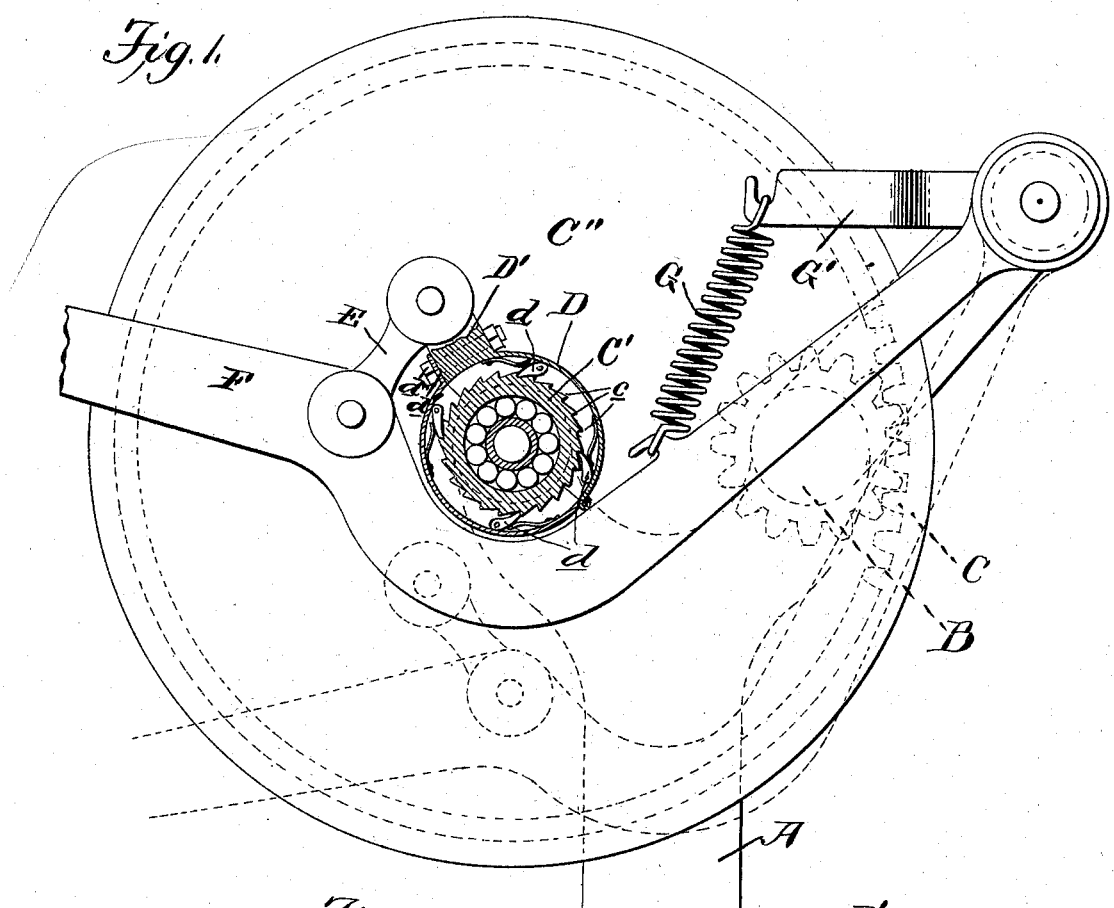
Figure 2:
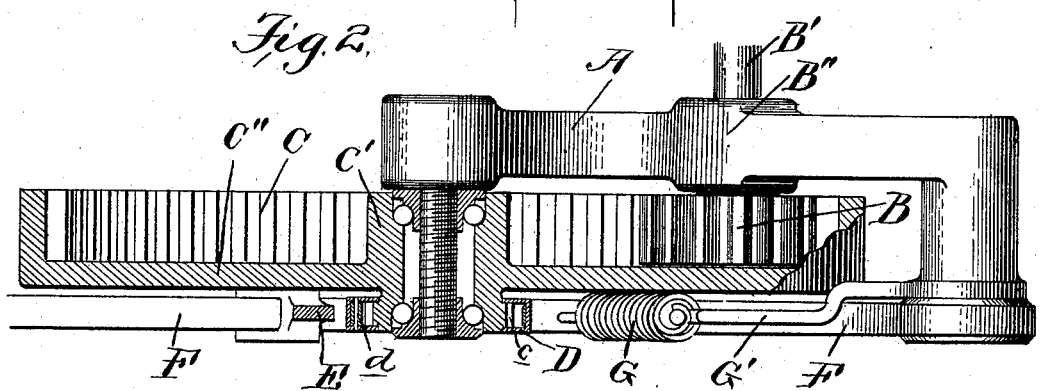

Figure 1 is a side elevational view of my improved mechanism, part of the power-lever being broken away. Fig. 2 is a cross-sectional view, portions being shown in top plan.

This invention relates to a new and useful improvement in clutches; and it consists in the construction, arrangement, and combination of the several parts, all as will hereinafter be described and afterward set forth in the claims.

The object of the invention is to produce a clutch adapted to be applied to numerous forms of machinery where it is desired to obtain greater speed, which clutch is simple, compact, and durable and requires little, if any, additional expenditure of energy to effect its operation.

Generally stated my improved clutch consists of what may be termed a "sun-and-planet" gearing, consisting of a pinion and a toothed ring adapted to transmit motion to said pinion, and a ratchet-and-pawl mechanism for driving the gearing, said ratchet-and-pawl mechanism being operated by a lever, which is adapted to be rocked by the hand or foot of an operator, according to the nature of the machinery to be driven.

In the drawings, A indicates a standard upon which the several parts of the mechanism are mounted and held in their proper relative positions.

B indicates a pinion mounted upon the end of a shaft B', journaled in a bearing B'' on the upper portion of the standard A, which shaft B' is the shaft which operates the machinery to be driven and is adapted to have mounted upon it a suitable fly-wheel, if desired.

C indicates an internally-toothed ring provided with a hub C', which may be held in place by suitable spokes, or, preferably, as illustrated in the drawings, a plate C'' integral therewith and with the ring C. The hub C' is journaled upon a stub-axle secured to the standard A at such a point that the teeth of the ring C mesh with the teeth of pinion B, whereby upon the rotation of the ring motion is imparted to the pinion. It is to be understood in this connection that an externally-toothed wheel or ring would operate in precisely the same manner, the object in employing a ring provided with internal teeth being for sake of compactness and to protect the teeth of both the ring and pinion. The plate C'' serves in a measure to exclude grit or foreign particles and materially strengthens the ring C.

The ring C is driven by a ratchet-and-pawl mechanism comprising ratchet-teeth $c$, formed on the periphery of the outer end of hub C', with which teeth engage spring-pressed pawls $d$, mounted in an annular housing D, surrounding the outer end of the hub, as shown, and freely movable thereon. This housing is formed of two sections having a hinged connection, one of said sections being provided with an apertured lug or projection D', while the other section is formed with an outturned portion $d'$, which is also formed with an opening. A bolt $d''$ is passed through the openings in portions $d'$ and D' and provided with a nut on its outer end, which is adapted to impinge against lug D' and lock the sections together.

The inner edges of the side walls of the housing have bearings on the hub C' on each side of the teeth $c$, as shown more clearly in Fig. 2, the housing thereby running "true" or without vibration or wabbling in its return movement after an operation of the actuating-lever is effected.

In the outer end of lug D' is pivoted the end of a link E, whose other end is pivotally connected to a lever F. The lever F is pivoted to a stationary part, preferably an extension of standard A, as shown, while its outer end may be extended to a suitable length and provided with a foot-pedal or hand-grasp, as desired or necessary.

G indicates a spring secured at one end to a bracket G', mounted upon the standard, and at its other end to the lever F, its function being to return the lever to its normal position after being rocked by an operator.

Suitable roller or ball bearings may be provided in the journals of all rotating parts of the mechanism, but as they form no part of this invention I have deemed it unnecessary to describe in detail such features.

The operation of the invention is as follows: The lever being depressed will, through its linked connection with housing D, rotate said housing, which in turn by its pawls *d* engaging the teeth *c* rotate ring C, which in rotating will impart motion to pinion B. Pinion B, being of much smaller diameter, will rotate much faster than its driving-ring, thereby imparting a speedy motion to its attached shaft. After the lever has reached the limit of its downward movement and is relieved of pressure the tension of spring G will tend to return the lever to its normal position, causing the housing D to rotate in a reverse direction independent of the hub of the ring C, the pawls riding over the teeth to permit this.

In the drawings I have shown in dotted lines the lever depressed such a distance that the ring C is driven one-third of a complete revolution, which movement of the ring will drive the pinion B about two complete revolutions. It is obvious, however, that by limiting the throw of the lever and varying the relative sizes of the ring and pinion different speeds can be attained without in the least departing from the nature and principle of my invention.

Having thus described my invention, what I claim, and desire to secure by Letters Patent, is—

1. In a clutch, the combination with a pinion, of a gear-wheel, adapted to mesh with said pinion, a ratchet-and-pawl mechanism for imparting motion to said gear-wheel, said mechanism comprising ratchet-teeth formed on the hub of said gear-wheel, said hub being formed with bearing-shoulders on each side of the ratchet-teeth and within the line of said teeth, a divided housing mounted upon said bearing-shoulders, spring-pressed pawls in and carried by said housing which are adapted to engage the ratchet-teeth, and a spring-returned operating-lever having a linked connection with said housing; substantially as described.

2. In a clutch, the combination with a supporting-standard, of a shaft to be driven mounted therein, a pinion on said shaft, a power-lever fulcrumed on said standard, an internal gear mounted on said standard between the same and the lever and meshing with said pinion, ratchet-teeth formed on the hub of said internal gear on the side adjacent the lever, a bearing-shoulder on said hub on each side of the ratchet-teeth, an annular housing rotatively mounted on said bearing-shoulders and inclosing said ratchet-teeth, a spring-pressed pawl carried by said housing and adapted to engage said ratchet-teeth, and a link connection between said lever and housing, substantially as described.

In testimony whereof I hereunto affix my signature, in presence of two witnesses, this 11th day of January, 1897.

FRANCIS J. LYONS.

Witnesses:
F. R. CORNWALL,
HUGH K. WAGNER.